Patented Dec. 1, 1942

2,303,350

UNITED STATES PATENT OFFICE 2,303,350

METAL COATING

William A. Fuller, San Jose, Calif.

No Drawing. Application April 14, 1941,
Serial No. 388,561

4 Claims. (Cl. 148—6)

The present invention relates particularly to a coating for an aluminum-containing surface.

In the many diversified uses of aluminum, a simple and economical means has long been sought whereby an aluminum-containing surface could be treated in such a manner as to present a permanent and uniformly black surface, and one wherein the surface treated would form a suitable foundation for the application and retention of other surface finishes such as lacquers, japans, paints and enamels.

It is, therefore, one object of my invention to provide a coating having the characteristics above indicated for aluminum-containing surfaces, and one that may be quickly and easily applied by a simple brushing or dipping process.

It is another object of the invention to provide a coating of the character indicated that may be easily manipulated to produce what are known to those skilled in the art as optical black, oxidized, and antique finishes.

My invention consists, briefly, in first thoroughly cleansing the aluminum-containing surface to be coated, and then brushing it with, or dipping it in, a solution made up from a selenium compound which produces a selenous acid and a soluble halogen salt of copper.

The following example is merely illustrative and in no way is to be understood as limiting the scope of my invention, but will serve to make clear one specific application thereof.

The surface to be coated is first cleaned thoroughly by means of any of the processes well known to the art, taking care that all grease or other fatty matter is removed, and then it is dipped into a solution made up from approximately five grams of selenium dioxide and five grams of cupric chloride in five hundred cubic centimeters of water.

Having this described my invention, what I claim as new and desire to secure by Letters Patent, is:

1. A dilute aqueous solution for producing a black coating on aluminum made up from a mixture of a selenium compound which produces a selenous acid, and a soluble halogen salt of copper.

2. A dilute aqueous solution for producing a black coating on aluminum made up from a mixture of selenium dioxide and a soluble halogen salt of copper.

3. A dilute aqueous solution for producing a black coating on aluminum made up from a mixture of a selenium compound which produces a selenous acid, and cupric chloride.

4. A dilute aqueous solution for producing a black coating on aluminum made up from a mixture of selenium dioxide and cupric chloride.

WILLIAM A. FULLER.